United States Patent
Liu et al.

(10) Patent No.: US 11,017,108 B2
(45) Date of Patent: May 25, 2021

(54) STORAGE UNIFICATION WITH SECURITY MANAGEMENT

(71) Applicant: INTERNATIONAL BUSINESS MACHINES CORPORATION, Armonk, NY (US)

(72) Inventors: Su Liu, Austin, TX (US); Wu Song Fang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

(21) Appl. No.: 16/174,481

(22) Filed: Oct. 30, 2018

(65) Prior Publication Data
US 2020/0134218 A1 Apr. 30, 2020

(51) Int. Cl.
G06F 21/62 (2013.01)
G06F 21/60 (2013.01)
G06F 16/16 (2019.01)
G06F 16/182 (2019.01)

(52) U.S. Cl.
CPC ........ G06F 21/6218 (2013.01); G06F 16/168 (2019.01); G06F 16/183 (2019.01); G06F 21/602 (2013.01)

(58) Field of Classification Search
CPC .. G06F 21/6218; G06F 21/602; G06F 16/183; G06F 16/168
See application file for complete search history.

(56) References Cited

U.S. PATENT DOCUMENTS

| | | | |
|---|---|---|---|
| 8,214,376 | B1 | 7/2012 | Jordan |
| 8,731,190 | B2 | 5/2014 | Lumb |
| 8,762,348 | B2 | 6/2014 | Lumb |
| 8,769,270 | B2 | 7/2014 | Orsini |
| 8,799,413 | B2 | 8/2014 | Taylor |
| 8,839,102 | B2 * | 9/2014 | Li ......................... G06F 40/126 715/256 |
| 9,483,486 | B1 | 11/2016 | Christiaens |
| 9,565,253 | B2 | 2/2017 | De Sene |
| 10,013,181 | B2 | 7/2018 | Borlick |

(Continued)

FOREIGN PATENT DOCUMENTS

| | | | | |
|---|---|---|---|---|
| GB | 2575667 | A * | 1/2020 | ............ H04L 9/088 |
| KR | 20060057563 | A | 5/2006 | |

(Continued)

OTHER PUBLICATIONS

"Multcloud: Use Google Drive with Multiple Accounts-No Switching," https://www.multcloud.com/. Posted Jul. 26, 2016. Retrieved Jul. 24, 2018.

(Continued)

*Primary Examiner* — Sher A Khan
(74) *Attorney, Agent, or Firm* — Cantor Colburn LLP; Steven Chiu (57) ABSTRACT

A computer-implemented method includes receiving a respective indication of each of two or more clouds. The two or more clouds are added to a user account. A first file is received for storage in the user account. The first file is split into a plurality of data blocks. The plurality of data blocks of the first file are distributed across the two or more clouds. An indication of a respective location of each data block of the first file is saved.

23 Claims, 4 Drawing Sheets

(56) References Cited

U.S. PATENT DOCUMENTS

| | | |
|---|---|---|
| 2002/0120874 A1 | 8/2002 | Shu |
| 2006/0259950 A1* | 11/2006 | Mattsson ............ H04L 63/1433 726/1 |
| 2011/0072042 A1* | 3/2011 | Guarraci ................ G06F 16/27 707/769 |
| 2011/0313902 A1* | 12/2011 | Liu ........................ G06Q 30/04 705/34 |
| 2012/0278622 A1 | 11/2012 | Lesavich |
| 2014/0164449 A1 | 6/2014 | Kim |
| 2014/0201541 A1* | 7/2014 | Paul .................... G06F 21/6245 713/193 |
| 2015/0178007 A1 | 6/2015 | Moisa |
| 2015/0363607 A1* | 12/2015 | Yang ........................ H04L 9/14 713/165 |
| 2016/0088068 A1* | 3/2016 | Toy .................... H04L 67/1097 709/219 |
| 2016/0150047 A1* | 5/2016 | O'Hare ................ G06F 3/0619 713/168 |
| 2016/0253516 A1* | 9/2016 | Beiter ...................... H04L 9/14 713/165 |
| 2017/0155676 A1* | 6/2017 | Tamir .................... G06F 21/577 |
| 2018/0234432 A1* | 8/2018 | Allo ...................... H04L 63/123 |
| 2018/0254895 A1* | 9/2018 | Castinado ............ H04L 9/0852 |

FOREIGN PATENT DOCUMENTS

| | | |
|---|---|---|
| WO | 2004084523 A1 | 9/2004 |
| WO | 2010135412 A2 | 11/2010 |

OTHER PUBLICATIONS

"SWITCHdrive: store and share files online," URL: https://www.switch.ch/drive/.

Verma et al., "Heterogeneous Data Storage of Different Cloud Services," International Journal of Emerging Trends & Technology in Computer Science (IJETTCS), vol. 4, Issue 4. Jul.-Aug. 2015. pp. 168-171.

* cited by examiner

STORAGE UNIFICATION WITH SECURITY MANAGEMENT

BACKGROUND

The present invention relates to storage management and, more specifically, to storage unification with security management.

Due to popularity, many cloud services now exist. Clouds can be cheaper and more convenient than local services. Due to the lower cost and improved convenience, as compared to local services, many users have accepted and use clouds in their daily lives for various purposes. As such, a user is likely to have accounts associated with multiple clouds. Each cloud generally provides an account along with a dedicated client enabling the user to connect to cloud resources.

For instance, a user may use six different clouds, each providing the following respective cloud storage space for the user: 10 GB, 40 GB, 20 GB, 10 GB, and 20 GB. If the user has 100 GB of data, such as photos or videos, to store in the clouds, the user is not able to store this data in a single cloud. Thus, the user must manually divvy up the data among the available clouds.

With large amounts of data being stored in clouds, security is an urgent issue, especially when the data being stored remotely is personal information or important documents. Most cloud security utilizes passwords and encryption. However, outside of selecting his or her own password, a user has no say in encryption methods, because each cloud defines its own security measures.

Thus, cloud services present drawbacks. When a user has multiple clouds in use, each cloud requires a respective password to access a respective account, which can be inconvenience for users. Additionally, security options are limited as they are predefined by each cloud service. Thus, although cloud services benefit users, security and convenience could be improved.

SUMMARY

Some embodiments of the present invention are directed to a computer-implemented method for storage management. A non-limiting example of the computer-implemented method includes receiving a respective indication of each of two or more clouds. The two or more clouds are added to a user account. A first file is received for storage in the user account. The first file is split into a plurality of data blocks. The plurality of data blocks of the first file are distributed across the two or more clouds. An indication of a respective location of each data block of the first file is saved.

Some embodiments of the present invention are directed to a system for storage management. A non-limiting example of the system includes a memory having computer-readable instructions and one or more processors for executing the computer-readable instructions. The computer-readable instructions may implement the above method.

Some embodiments of the invention are directed to a computer-program product for storage management, the computer-program product including a computer-readable storage medium having program instructions embodied therewith. The program instructions are executable by a processor to cause the processor to perform the above method.

Thus, advantageously, a file may be secured by splitting that file and distributing the file across multiple clouds. That data blocks of the file would thus need to be aggregated to recreate the file, which can be difficult to do without authorization.

Additionally or alternatively to the above, a request may be received to access the first file. The respective location of each data block of the first file may be determined. Each data block of the first file may be retrieved from the respective location in the two or more clouds. The plurality of data blocks may be retrieved to recreate the first file, and access may be provided to the recreated first file. Thus, in some embodiments of the invention, the first file can be retrieved for an authorized user, transparently, such that the user need not be aware of how the data blocks of the first file are distributed.

Additionally or alternatively to the above, it may be determined that shuffling criteria applicable to the first file are met. Responsive to the shuffling criteria being met, the plurality of data blocks of the first file may be shuffled among the two or more clouds. Thus, in some embodiments of the invention, the first file is periodically shuffled to change the respective locations of the data blocks, such that an unauthorized user would have to know the current location of each data block to recreate the file.

Additionally or alternatively to the above, the first file may be assigned a splitting algorithm defining how to split the first file into the plurality of data blocks, as well as a shuffling algorithm defining when to shuffle the plurality of blocks among the two or more clouds. At least one of the splitting algorithm and the shuffling algorithm are selected based on a security level of the file. As such, in some embodiments of the invention, security can be varied across files according to the level of security desired for those files.

Additionally or alternatively to the above, the first file may be assigned an encryption algorithm, as well as an allocation algorithm defining how to distribute the plurality of data blocks among the two or more clouds. As such, the first file may be encrypted and allocated in a customized manner according to, respectively, the assigned encryption algorithm and the assigned allocation algorithm.

Additionally or alternatively to the above, the two or more clouds may be mapped to a single drive or a single folder. As a result, the use of the two or more clouds can remain transparent to the user, who can treat the files in the clouds as if those files are stored locally.

Additionally or alternatively to the above, a plurality of files may be received for storage in the user account. Each of such files may be split into a respective plurality of data blocks, where those data blocks are distributed across the two or more clouds. A file management tree may be maintained to describe a virtualized hierarchy of the plurality of files and the first file. The user may be enabled to navigate the file management tree to select the first file. The first file may be retrieved from the two or more clouds, responsive to the selection. Thus, conveniently, the user can treat the files stored distributed across the clouds as if they are stored locally. The distribution of these files may remain transparent to the user.

Embodiments of the present invention are directed to a computer-implemented method for storage management. A non-limiting example of the computer-implemented method includes receiving a first file for storage. The first file is assigned a first set of security attributes, including at least one of a first encryption algorithm, a first splitting algorithm, a first allocation algorithm, and a first shuffling algorithm. A second file is received for storage. The second file is assigned a second set of security attributes, including at least one of a second encryption algorithm, a second splitting algorithm, a second allocation algorithm, and a second shuffling algorithm. The second set of security attributes differ from the first set of security attributes. The first file is distributed across two or more clouds according to the first set of security attributes. The second file is distributed across the two or more clouds according to the second set of security attributes. The two or more clouds are presented as at least one of a single drive and a single folder.

Thus, advantageously, embodiments of the invention enable security attributes to be customized for each file. Each file may be stored across multiple clouds according to its respective security options. The user need not be aware of these security attributes or of how the files are distributed, which may be implemented transparently after initialization, but instead, the user may access the files as if the files are stored locally.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of the aspects of the invention, one or more embodiments of the invention address the above-described shortcomings of the prior art by providing a mechanism to transparently unify heterogenous cloud storage in a manner that presents a uniform interface to a user and also provides security options selectable by the user. In some embodiments of the invention, the various cloud storages managed are mapped to a single drive or folder of a computer system, thus enabling the user to use the clouds as if they were a single local drive or local folder. Each file may be encrypted and may be split into data blocks, which may be distributed across multiple clouds. For additional security, these data blocks may be occasionally shuffled among the clouds, automatically or upon explicit instruction from the user.

The above-described aspects of the invention address the shortcomings of the prior art by enabling the user to utilize various clouds as if they were a single local drive or local folder. As such, the user need not be concerned about respective space availability in each cloud. Further, embodiments of the invention provide improved security options by splitting files and shuffling their resulting data blocks across clouds, thereby requiring a bad actor to identify current locations of data blocks, recombine the data blocks into a file, and decrypt the resulting file in order to retrieve a file without authorization.

Figure 1:
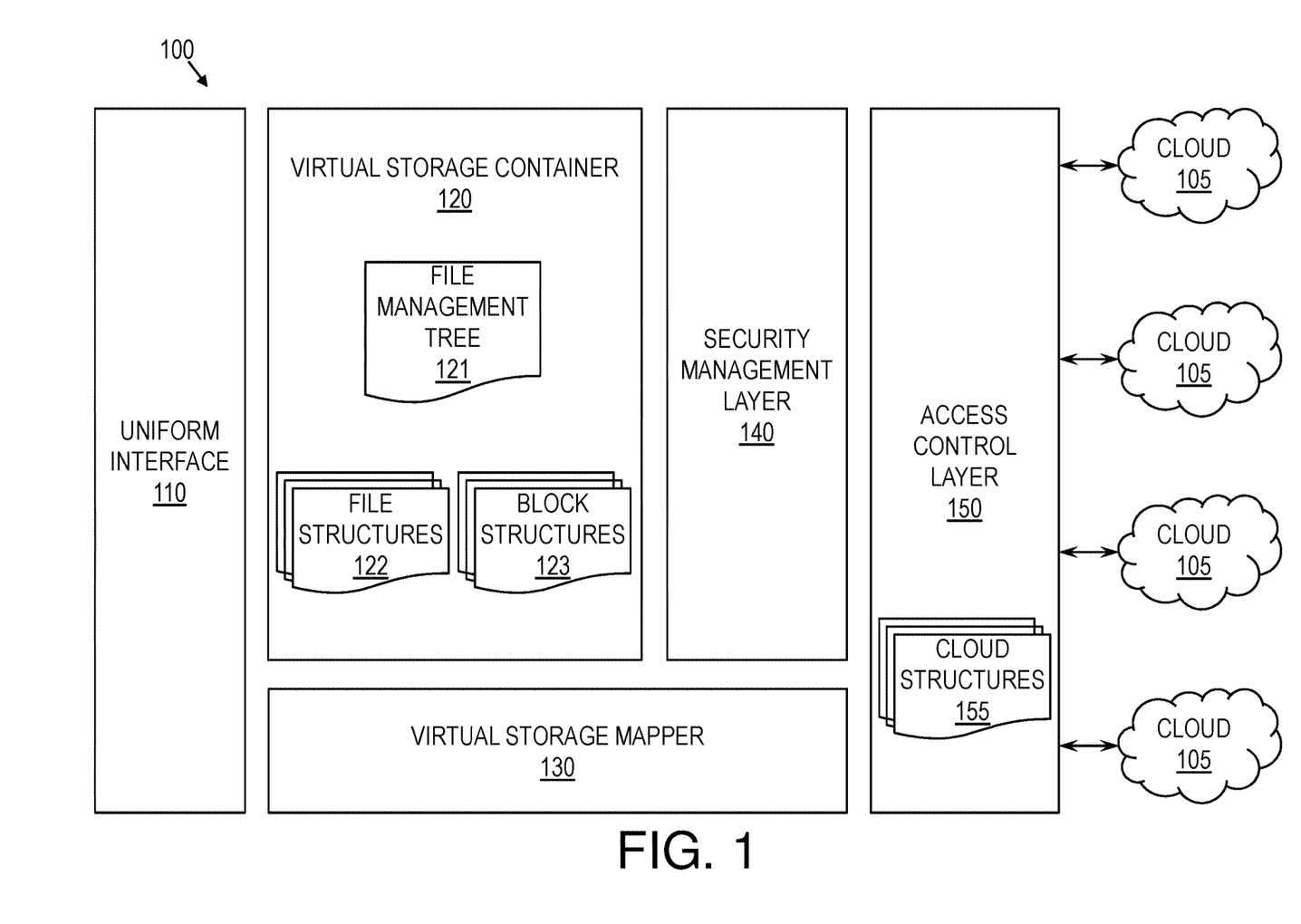
FIG. 1 is a diagram of a storage system according to some embodiments of the invention.

Turning now to a more detailed description of aspects of the present invention, FIG. 1 is a diagram of a storage system 100 at a high level according to some embodiments of the invention. As shown in FIG. 1, the storage system 100 may include a uniform interface 110, a virtual storage container 120, a virtual storage mapper 130, a security management layer 140, and an access control layer 150. Together, as discussed in detail below, these components may enable a user to utilize multiple clouds 105 as if they are a single cloud, or as if they are a single local drive or a local folder, and may implement a dynamic security system with options selectable by the user. Each of the uniform interface 110, the virtual storage container 120, the virtual storage mapper 130, and the access control layer 150 may include software, hardware, or a combination of both. For example, and not by way of limitation, each of the uniform interface 110, the virtual storage container 120, the virtual storage mapper 130, and the access control layer 150 may be implemented as one or more software modules or specialized hardware circuits. Further, although these components are shown and described as being distinct, it will be understood that they may share hardware, or software, or a combination of both. For instance, in some embodiments of the invention, the uniform interface 110, the virtual storage container 120, the virtual storage mapper 130, and the access control layer 150 are integrated into a single software package.

As shown in FIG. 1, the uniform interface 110 resides communicatively between the user and various other aspects of the storage system 100. In some embodiments of the invention, the uniform interface 110 adds one or more clouds 105 and associated attributes to a user account of the user to enable user access to such clouds 105. The uniform interface 110 may provide a graphical user interface (GUI) or an application programming interface (API) enabling the user to utilize the clouds 105 added to the user account. For instance, the uniform interface 110 may provide a virtual disk or mounted folder, such as in the form of a direct attached storage (DAS) disk, which is usable through input/output (I/O) functionality of an operating system of the computer system on which the storage system 100 operates. In some embodiments of the invention, the various files and folders of the clouds 105 are presented to the user through the same interface as used by local files and folders. In other words, the uniform interface 110 may leverage the operating system's read and write API. As such, the uniform interface 110 may seamlessly enable read or write operations of files stored in the clouds.

Clouds 105 added to a user account of the storage system 100 may be local, remote, public, private, or some combination thereof, for example. Such clouds may include, for example, one or more of the following: Amazon® storage, Google® Drive, Microsoft® One Drive, Huawei®, Baidu®, or others. Each cloud 105 may provide one or more cloud services, such as cloud storage. Although this disclosure focuses on cloud storage, it will be understood that other cloud services may also be accessible through the storage system 100. For initialization, the uniform interface 110 may receive from the user, for each cloud 105 the user wishes to access, an identifier of the cloud 105 and a set of one or more attributes. In some embodiments of the invention, the uniform interface 110 has knowledge of a set of available clouds, along with global locations of those clouds 105 and access protocols of those clouds 105, and the user can select from among the available clouds 105 to effectively provide an identifier. For each cloud 105 identified, the associated set of attributes received from the user may include, for example, authentication data, such as a username and a password. The storage system 100 may thereby log into the clouds 105 on the user's behalf. Further, the storage system 100 may seamlessly log into the clouds 105 as needed, such that it appears to the user that the user remains logged in.

In some embodiments of the invention, the virtual storage container 120 manages stored data, enabling presentation to the user, through the uniform interface 110, of a uniform storage space. More specifically, the virtual storage container 120 may maintain a plurality of data structures associated with clouds 105, files, and data blocks making up files, where those data structures represent and define relationships among clouds 105, files, and data blocks. Thus, the virtual storage container 120 may maintain lists of files and folders, may split files into data blocks and recombine data blocks into files as needed, and may allocate and release data blocks as needed.

According to some embodiments of the invention, the user need not know where each file (e.g., each photo, video, or document) is located, because the virtual storage container 120 may seamlessly handle the mapping. It will be understood by one skilled in the art that various data structures may be used by the virtual storage container 120 to maintain information about the mapping. However, in some embodiments of the invention, the virtual storage container 120 utilizes the following data structures or data structures that can be used for similar purposes: a file management tree 121, a file structure 122, and a block structure 123. It will be understood, however, that the information represented in these data structures can be arranged and maintained in additional or alternative forms.

In some embodiments of the invention, the storage system 100 is able to divide a file into a set of one or more corresponding data blocks, which can be distributed across one or more of the clouds 105 associated with the user account. Further, as will be discussed in detail below, these data blocks may be shuffled among the clouds 105 from time to time. The virtual storage container 120 may maintain the information necessary to recompile a distributed set of data blocks into an original file as needed.

Generally, the file management tree 121 may maintain information about virtualized storage in the user account. For instance, the file management tree 121 may maintain a virtual hierarchy of folders and files, such that the user may access files in the storage system 100 by navigating that hierarchy as would be the case with local folders and files, and such that the user may modify the hierarchy as desired in the same manner, or a similar manner, in which the user modifies a local hierarchy of files and folders. To this end, for example, the data structure if the file management tree may be a tree, including a set of internal nodes and a set of leaf nodes, with each leaf representing a file. Further, each leaf node may reference a file structure 122 representing a file that has been added to the user account on the storage system 100. With the file structure 122, the virtual storage container 120 may determine how to retrieve the file from the clouds 105 as described below.

Each file structure 122 may correspond to a particular file maintained by the storage system 100 and stored in the clouds 105. A file structure 122 may include a file identifier, such as a file name, usable as an index. Additionally, the file structure may maintain a set of variables used to store attributes describing how the file is managed by the storage system 100. Each file may be divided into a set of data blocks, which may be distributed among the clouds 105. The various attributes in a file structure 122 may define one or more of the following: an encryption algorithm, a splitting algorithm, an allocation algorithm, and a shuffling algorithm. The values of these attributes in a file structure 122 may be default values or may be set by the user, for example, in a set of general user preferences or in preferences specific to the file.

For instance, a first variable may indicate an encryption algorithm applied to the file, if encryption is being performed at the file level. In some embodiments of the invention, it not required for a file to be encrypted, or encryption may occur at the level of the data blocks. In these cases, for instance, an encryption algorithm need not be specified in the file structure 122.

A second variable may indicate a splitting algorithm, which may be used by the storage system 100 to split the corresponding file into data blocks. Further, the splitting algorithm may indicate to the virtual storage container 120 how to aggregate the data blocks to obtain the complete file again, which may be performed by reversing the specified splitting algorithm. For example, and not by way of limitation, the splitting algorithm may indicate that the file is to be split into evenly sized data blocks of a predetermined size, into a predetermined number of data blocks of approximately equal size, or into data blocks sized or numbered based on space availability in certain clouds 105. It will be understood that various splitting algorithms may be available to the storage system 100 and therefore usable for a file.

A third variable may indicate an allocation algorithm, or distribution algorithm applicable to the file and, thus, to data blocks of the file. Specifically, the allocation algorithm may indicate how the various data blocks are distributed across the clouds 105. Further, the allocation algorithm may indicate how to locate the data blocks of the file for later recombination, such as by reversing the allocation algorithm.

A fourth variable of the file structure 122 may indicate a shuffling algorithm which determines when or how to shuffle the corresponding data blocks across the clouds 105, thereby changing which data blocks of the file are stored in each cloud 105. For example, and not by way of limitation, this fourth variable may define a frequency or interval for the shuffling. In some embodiments of this invention, the shuffling algorithm includes a shuffling criteria. When the shuffling criteria are met, then the storage system 100 may shuffle the data blocks of the file. The shuffling algorithm may further include an indication of whether instances of shuffling are initiated manually or automatically. The file structure 122 may also include a shuffling record, which may indicate a history of how the data blocks of the file have been distributed and redistributed across the clouds 105 over time.

Additionally, the file structure 122 may include information to enable mapping the file to the set of data blocks into which the file was split. Specifically, the file structure 122 may include a set of references, where each reference is to a block structure 123 representing a data block in the file. These references may be in the form of a pointer to each block structure 123 or in the form of a list of identifiers of the data blocks, for instance.

Each block structure 123 may correspond to a particular data block of a file, where a file may be split into a set of one or more blocks, and where being split into one block is equivalent to not being split. A block structure 123 may include a block identifier, which may be used as an index to the block structure 123. Additionally, the block structure 123 may include a cloud identifier, which may be a uniform resource identifier (URI) of a cloud 105 or a local cloud identifier, for instance. The cloud identifier of a block structure 123 may indicate which cloud 105 holds the data block corresponding to the block structure 123.

In some embodiments of the invention, the virtual storage mapper 130 maintains the connection between local and cloud storage. More specifically, for instance, the virtual storage mapper 130 may retrieve data blocks from the clouds 105 as needed and may aggregate those data blocks to recreate files, such that the files appear to the user to be stored locally. As such, the file can be presented to the reader through the uniform interface 110, and the reader can be enabled to read a file through the use of the storage system 100. When the user modifies a file in the storage system 100, this modification may be received at the uniform interface 110, and the virtual storage mapper 130 may update the version of the file in the clouds 105, such as by splitting the modified file into updated data blocks and storing the updated data blocks in the clouds 105 in place of the data blocks forming the prior version of the file. When the user deletes a file from the storage system 100, this deletion may be received at the uniform interface 110, and the virtual storage mapper 130 may locate the corresponding data blocks and delete them from the clouds 105, thus releasing the storage space. Additionally, the virtual storage mapper 130 may adjust the appropriate data structures (e.g., the file management tree 121, the file structure 122 and the one or more block structures 123) of the storage system 100 accordingly.

In some embodiments of the invention, the security management layer 140 manages security for the storage system 100. More specifically, for instance, the security management layer 140 manages security through encryption, shuffling of data blocks, or other means. The security management layer 140 may be self-driven, meaning that it may operate autonomously to shuffle data blocks according to applicable criteria and algorithms. The security management layer 140 may include manual or automatic shuffling, or a combination of both. In some embodiments of the invention, the security management layer 140 provides an intelligent mechanism to shuffle data blocks of files according to security level, real-time risk factors, or other factors.

In some embodiments of the invention, although a file may be initially assigned security attributes, such as an encryption algorithm, a splitting algorithm, an allocation algorithm, and a shuffling algorithm, these security attributes may be dynamic, and the security management layer 140 may modify these attributes of a file based on various factors. These factors may include, for example, reliability, availability, securability, accessibility, vulnerability, intruder evidence, and network status. For instance, if a security risk, such as an unauthorized intrusion attempt, is detected with respect to a file, then the security management layer 140 may automatically increase the applicable security by modifying the security attributes of that file. This may be achieved by automatically updating the file structure 122 applicable to the file, retrieving the file, and, as applicable based on the modification to the security attributes, re-encrypting, re-splitting, and re-allocating the file according to the updated security attributes. In some embodiments of the invention, the security management layer 140 includes an API, through which the user can modify security attributes of the various files, manually initiate shuffling, or perform other tasks. As such, through the security management layer 140, the storage system 100 may provide the user with robust and flexible security options.

As discussed above, each file may be represented by a respective file structure 122 and may be associated with a shuffling algorithm, which defines shuffling criteria, where the shuffling algorithm may be stored in the respective file structure 122. When the shuffling criteria of a file are met, then the security management layer 140 may shuffle the data blocks of that file. To this end, the security management layer 140 may check the shuffling record, or the block structures 123 associated with the file, to determine the current locations of each data block in the file. The security management layer 140 may determine an updated location (e.g., a new cloud 105) for each data block in the file, based at least in part on the shuffling algorithm, the allocation algorithm, or a combination of both. For a given data block, the updated location may or may not be the same as the current location (e.g., the current cloud in which the data block is stored), but various data blocks may be assigned updated locations that differ from their respective current locations. The security management layer 140 may then retrieve each data block from its respective current location, delete the data block from that current location to release the storage space, and resave the data block to the respective updated location. This retrieving and resaving may be performed for each data block for which the updated location differs from the current location. In this manner, the data blocks of the file may be shuffled. In some embodiments of the invention, shuffling does not affect and is not affected by encryption, and the data blocks maintain their current state of encryption, if any, while being shuffled.

In some embodiments of the invention, the access control layer 150 provides uniform access control to the user. In other words, the access control layer 150 seamlessly connects to and interacts with the clouds 105, potentially out of view of the user after initial setup of each cloud 105. In some embodiments of the invention, the virtual storage mapper 130 utilizes the access control layer 150 to communicate with the clouds 105, so as to enable access to files and manipulation of files maintained by the storage system 100. To this end, the access control layer 150 may maintain, or at least utilize, a set of cloud structures 155, including one respective cloud structure 155 associated with a user account for each cloud 105 added to the user account by the user.

A cloud structure 155 may include at least one identifier, authentication data, and an access protocol. The identifier may be, for example, a local identifier assigned to the cloud 105 to uniquely identify the cloud 105 to the storage system 100 or a URI or other global identifier. In some embodiments of the invention, the cloud structure 155 includes both a local identifier and a global identifier. Alternatively, however, the global identifier may be used as a local identifier, if needed, and thus a separate local identifier need not be included in the cloud structure 155. The authentication data may include enough information to enable the access control layer 150 to authenticate the user to the cloud 105. For example, and not by way of limitation, the authentication data may include a private key or a username and password pair. The access protocol may indicate a protocol for accessing data on the cloud 105. For example, and not by way of limitation, the access protocol may indicate Network File System (NFS) or Samba. It will be understood, however, that a specific data structure or data structures utilized as the cloud structure 155 may vary and need not be exactly as described herein. Rather, the cloud structure 155 may be configured to enable communication with the clouds 105. With reference to the cloud structure 155, the access control layer 150 may thus authenticate the user to the cloud 105, perhaps in the background, out of the user's view, and may access data on the cloud 105 as needed.

Figure 2:
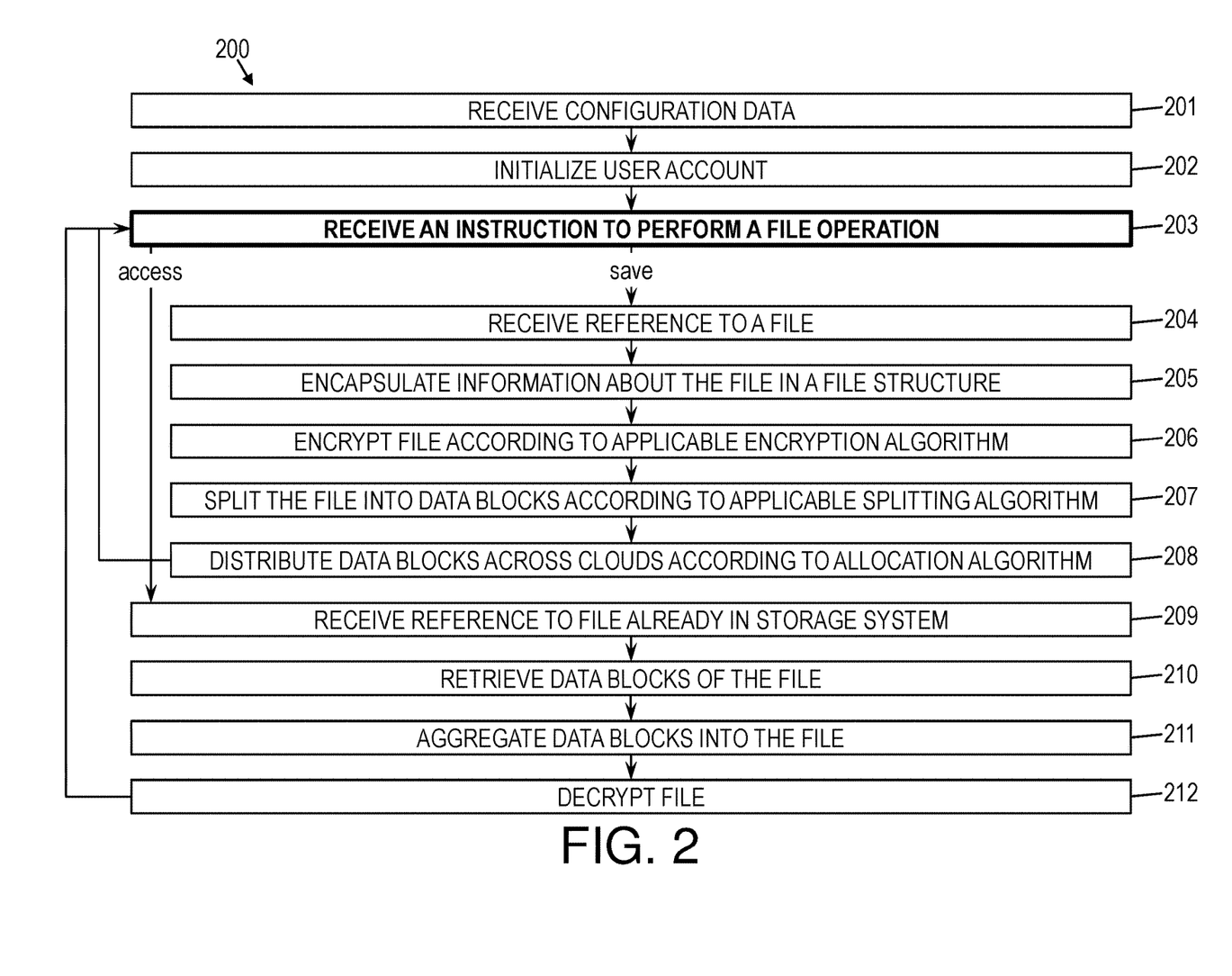
FIG. 2 is a flow diagram of a method of storing data through the storage system, according to some embodiments of the invention.

FIG. 2 is a flow diagram of a method 200 of storing data through the storage system 100, according to some embodiments of the invention. As shown in FIG. 2, at block 201, the uniform interface 110 may receive configuration data from a user. This configuration data may include, for instance, user preferences and data sufficient to enable access to one or more clouds.

In some embodiments of the invention, the storage system 100 enables the user to select user preferences, where these user preferences impact variables incorporated into the above data structures or elsewhere. For example, and not by way of limitation, the uniform interface 110 may provide a mechanism to present options of user preferences to the user and to store selected user preferences in a user account associated with the user. More specifically, the user preferences may include a preference for each security attribute that can be applied to a file.

For instance, the user preferences may indicate default values for various attributes, such as the attributes defining default encryptions, splitting algorithms, allocation algorithms, and shuffling algorithms. As such, when a new file is added to the storage system 100, the storage system 100 may be able to generate a corresponding file structure 122 that incorporates the default values identified in the user preferences. In some embodiments of the invention, a default value may be conditional, based on security level or file type, for instance. In that case, the user may select a different set of default values for a first file type (e.g., text document) as compared to another file type (e.g., photo) or may select a different set of default values for a file assigned a first security level as compared to a file assigned a second security level. As a result, a file for which high security is desired may be assigned enhanced security attributes, such as frequent shuffling (e.g., every few minutes), splitting into smaller and more numerous data blocks, or the strongest available encryption, while a file for which low security is desired may be assigned reduced security attributes, such as no shuffling or infrequent shuffling (e.g., once per week), splitting into one chunk per available cloud 105, or no encryption or weaker encryption. However, despite the user preferences, the uniform interface 110 may enable the user to customize these security attributes on a file basis, such that each file may have an assigned encryption algorithm, splitting algorithm, allocation algorithm, or shuffling algorithm, or a combination thereof, as selected for the file by the user.

In some embodiments of the invention, the uniform interface 110 enables the user to select from among a set of available clouds 105 known to the storage system 100, or the storage system 100 may enable the user to specify a new cloud 105 to be added. For each cloud selected, the uniform interface 110 may enable the user to input authentication data. If a cloud 105 selected by the user is known to the storage system 100, the uniform interface 110 may have prior data about the cloud 105, such as the global identifier and access protocol. If the storage system 100 does not already have this information, then the uniform interface 110 may interact with the user or contact the cloud 105 to determine this information.

At block 202, the storage system 100 may initialize a user account of the user. The user account may include the user preferences as well as one or more cloud structures 155 representing the clouds 105 selected by the user. The virtual storage mapper 130 may encapsulate information about each selected cloud 105 into a respective cloud structure 155. This information may include one or more cloud identifiers (e.g., a local identifier and a URI) for the cloud 105, the authentication data, and the access protocol.

At decision block 203, the storage system 100 may receive an instruction from the user to perform a file operation. For instance, the file operation may be saving a file or accessing a file. Saving a file may include, for example, adding a new file to the storage system 100 or saving a modification to a file already saved in the storage system 100. Accessing a file may include, for example, reading, downloading, writing, or deleting. To save a file, the method 200 may proceed to block 204. To access a file, the method 200 may proceed to block 209.

If the file operation is saving a file, then at block 204, the uniform interface 110 may receive from the user a reference to the file to be saved. For example, the storage system 100, specifically the uniform interface 110, may utilize the I/O functions of the operating system to enable the user to navigate the file management tree 121 to select the file, such that the user appears to be navigating a local hierarchy of files and folders. When newly adding the file to the storage system 100, the user may further indicate any file preferences to be used by the storage system 100 with respect to the file, where file preferences may be specific to the file being added. In some embodiments of the invention, the user preferences are used as a default, and the file preferences supersede the user preferences for the file in question. In some embodiments of the invention, the storage system 100 enables the user to add a single file or a batch of files at a time. In the latter case, the file preferences indicated may apply to each file in the batch, or the user may be enabled to enter different file preferences for each file or group of files in the batch.

At block 205, the file and the preferences applicable to the file (e.g., a combination of file preferences and general user preferences) may be encapsulated into a respective file structure 122 representing the file. Specifically, the file identifier in the file structure 122 may identify the file by filename or another identifier. The preferences, which may include user preferences or file preferences, or a combination of both as applicable, may be encapsulated into the file structure 122 as attributes that describe, for example, an encryption algorithm, a splitting algorithm, an allocation algorithm, a shuffling algorithm, or other attributes. The security management layer 140 may then perform allocation and security operations on the file, as described below.

At block 206, the security management layer 140 may encrypt the file according to the applicable encryption algorithm, which may be saved in the file structure 122 before or after the encryption is performed. In some embodiments of the invention, encryption by the storage system 100 may be an optional activity, and whether encryption is performed is determined by the preferences applicable to the file and stored in the file structure 122.

At block 207, the virtual storage container 120 may split the file according to the applicable splitting algorithm, which may be saved in the file structure 122 before or after the splitting itself is performed. Specifically, the file may be split into a set of one or more data blocks, such that the data blocks together form the file. For each data block, the virtual storage container 120 may generate a block structure 123 to represent the data block. The various block structures 123 representing data blocks making up the file may be referenced in the file structure 122. In the file structure 122, the virtual storage container 120 may save an indication of how to recombine the data blocks. However, in some embodiments of the invention, recombination may simply be the reverse of the splitting algorithm and need not be saved in the file structure 122 as a separate attribute.

It will be understood that, if used, encryption may be applied to the file as a whole before the file is split, as described above, or alternatively, the file may be split, and encryption may be applied to each data block individually. In some embodiments of the invention, the user preferences may indicate whether encryption or splitting is performed first, but alternatively, the storage system 100 may be consistent about which of these is performed first.

At block 208, the virtual storage container 120 may communicate with the virtual storage mapper 130, which may communicate with the access control layer 150, to distribute the data blocks of the file across the clouds 105 in accordance with the allocation algorithm applicable to the file. The allocation algorithm may be stored in the file structure 122, before or after the allocation actually takes place. Distribution of the data blocks across clouds 105 may be based, not only on the allocation algorithm, but also on the space detected to be available at each cloud 105. In some embodiments of the invention, local storage, such as a buffer, is required for encrypting the file or dividing the file, or both, before the file is transmitted to the clouds 105 for storage. In that case, temporary data in the local storage may be deleted after the upload is complete.

In the file structure 122, the virtual storage container 120 may save in the shuffling record an indication of the location (i.e., the cloud 105) of each data block. Further, the storage system 100 may indicate in each block structure 123 the cloud 105 to which the respective block was transmitted for storage. As such, the shuffling record may be used later to retrieve the various data blocks, or the references to clouds 105 in the block structures 123 may be used to retrieve the various data blocks.

Thus, as described above, the file may be encrypted, split into blocks, and distributed across the clouds 105. Further, enough information may be saved to enable retrieval, recombination, and decryption of the file later, as will be discussed below. The method 200 may then return to decision block 203 to await additional file operations.

If the file operation at decision block 203 is an access operation, then the uniform interface 110 may receive a reference to a file already stored in the storage system 100, at block 209. To this end, for example, the uniform interface 110 may enable the user to navigate the set of files in the file management tree 121, as if those files are stored in a local drive.

Upon receipt by the storage system 100 of an identifier of the file, the virtual storage container 120 may determine the locations of the data blocks of the file. More specifically, the virtual storage container 120 may determine which clouds 105 store data blocks of the file. This determination may be made through reference to the shuffling record, for example, or through reference to block structures 123 referenced by the file structure 122 representing the file. Each block structure 123 may indicate the cloud 105 in which the corresponding data block is stored.

If the file operation is a deletion, then the storage system 100 may delete each data block of the file from its respective cloud 105. To this end, for instance, the access control layer 150 may communicate the deletion to each respective cloud. In that case, remaining blocks 210 through 212 need not be performed.

Unless the file operation is a deletion, then at block 210, the virtual storage mapper 130 may retrieve the various data blocks making up the file, based on the locations associated with those data blocks. The data blocks may then be stored locally, for instance, in a local buffer.

At block 211, the virtual storage mapper 130 may aggregate the data blocks to form the file, for instance, according to a recombination algorithm indicated in the file structure 122. In some embodiments of the invention, the recombination algorithm need not be explicitly indicated in the file structure 122, but may be implied by the splitting algorithm, of which the recombination algorithm may be a reversal. At block 212, the file may be decrypted according to the encryption algorithm in the file structure 122. It will be understood that the order of aggregation and decryption may mirror the order of splitting and encryption, such that if the file was encrypted before being split, then the file may be recombined before being decrypted, and vice versa.

At block 212, the file may be presented to the user, responsive to the file operation. At this point, the file may have been retrieved, recombined, and decrypted, and may now be in its complete and readable form. The method 200 may then return to decision block 203 to await additional file operations.

Figure 3:
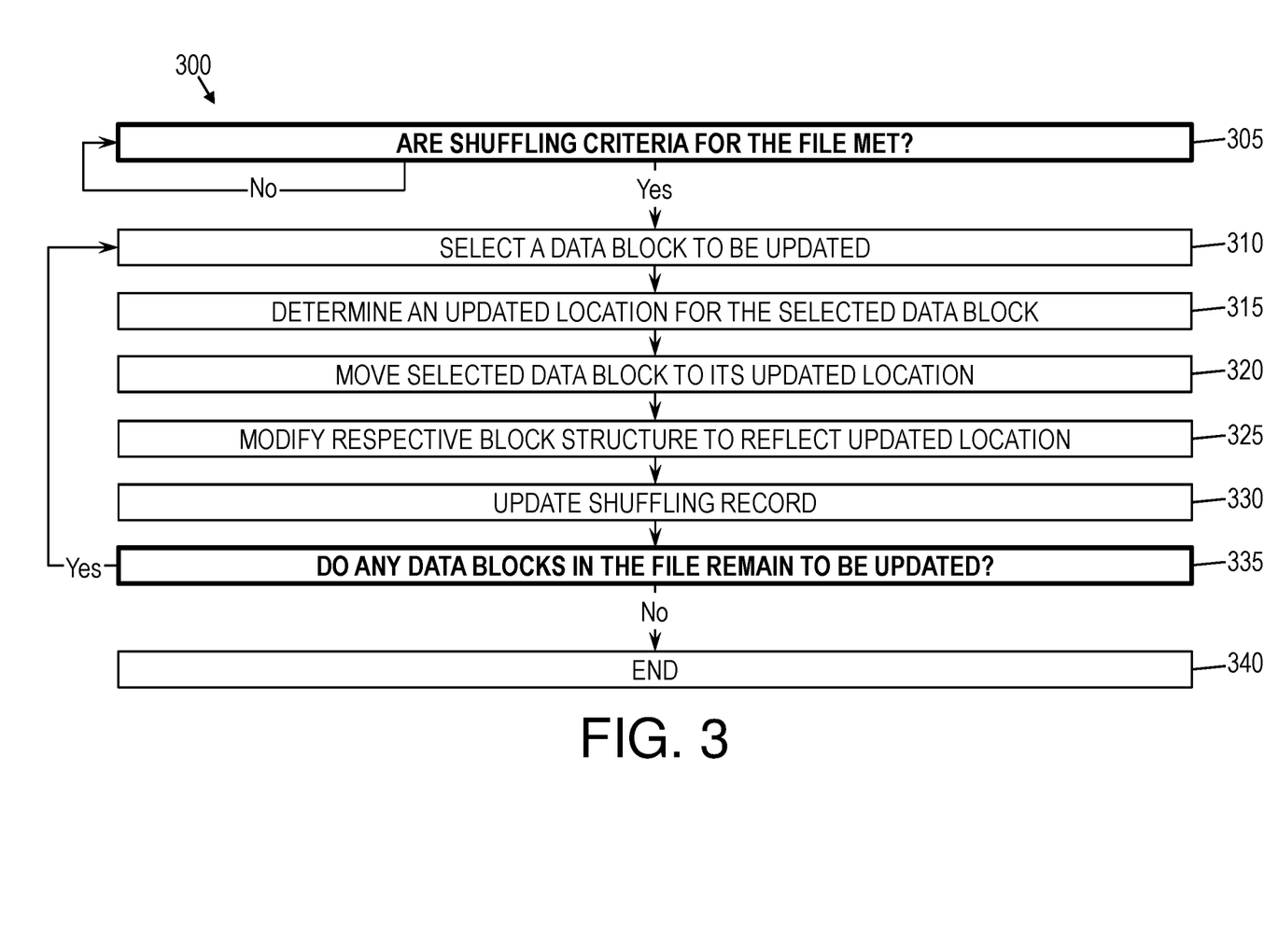
FIG. 3 is a flow diagram of a method of shuffling data blocks of files stored through the storage system, according to some embodiments of the invention.

FIG. 3 is a flow diagram of a method of shuffling data blocks of files stored through the storage system 100, according to some embodiments of the invention. As discussed above, each file may be associated with a shuffling algorithm, which defines how or how often, or both, the data blocks of the file are shuffled among the clouds 105. In other words, the shuffling algorithm may determine how to reassign data blocks to clouds 105 and may also establish a schedule or other shuffling criteria to initiate reassignment. For example, and not by way of limitation, a shuffling algorithm may indicate that the location of each data block is to be chosen at random from the clouds 105 with space available to hold the data block, and may further indicate that the locations of the data blocks are changed once per day. In some embodiments of the invention, shuffling may be initiated automatically or by way of explicit instruction by a user. In other words, in some embodiments of the invention, manual instruction to shuffle meets the shuffling criteria and thus initiates shuffling of data blocks.

In some embodiments of the invention, determination of a new location for a data block may be dependent on not only the shuffling algorithm, but also on the allocation algorithm. For instance, the allocation algorithm may determine which clouds 105 have data blocks of the file, and how many data blocks are allotted to each such cloud 105. In that case, the shuffling algorithm may then determine which data blocks are assigned to which clouds 105, within the constraints of the allocation algorithm. For each file, the respective shuffling algorithm may be indicated in the corresponding file structure 122 representing the file.

In some embodiments of the invention, as discussed above, the file may be encrypted. While encryption itself adds a layer of security to the file, distributing data blocks across clouds 105 adds a further layer of security. In that case, to obtain a file, a bad actor would need to identify the location of each data block and determine how to reassemble the file. Further, shuffling adds yet an additional layer of security, as shuffling modifies this distribution of data blocks of the file from time to time, thus creating a moving target with respect to the locations of the data blocks that would need to be reassembled to retrieve the file without authorization.

As shown in FIG. 3, at decision block 305, it may be determined whether the shuffling criteria for the file are met. If the shuffling criteria are not met, then no further shuffling occurs on the file at the given time, and the method 300 continues to wait until the shuffling criteria are met. However, if the shuffling criteria are met, then an iterative loop may begin to update the location of each data block in the file.

At block 310, a data block that has not yet been selected for update may now be selected. At block 315, an updated location may be determined for the selected data block. For each data block, the updated location may or may not be the same as the initial location. However, for the set of data blocks representing the file as a whole, at least some of the locations may change in order to constitute shuffling. At block 320, if the updated location differs from the initial location (i.e., the location prior to the current shuffle) of the data block, the data block may be moved from its initial location to its updated location. For instance, if a data block is currently stored in a first cloud and the updated location is a second cloud, then the data block may be retrieved from the first cloud, deleted from the first cloud to release the storage space, and stored in the second cloud. At block 325, the block structure 123 representing the data block may be modified to reference the updated location of the data block. At block 330, the shuffling record in the file structure 122 may be updated to indicate the updated location of the data block as well.

It will be understood by one skilled in the art, however, that the order of blocks 320, 325, and 330 may be changed, as long as the actual location of the data block and each record of its location is updated. Further, it will be understood that releasing the previously used storage space of each block (e.g., by deleting each data block from its initial location), may be performed after all data blocks have been copied to their updated locations at the conclusion of the iterative loops.

At decision block 335, it may be determined whether an additional data block in the file remains to be selected for update. If an additional data block remains, then the method 300 may return to block 310 to select another data block. However, if no additional data blocks remain, then the method may end at block 340.

In some embodiments of the invention, as described above, blocks 310 through 330 may be performed as an iterative loop, where each loop corresponds to a data block of the file. In that manner, the shuffling record and the block structures 123 may be updated with respect to each data block, one at a time. As a result, the period of time during which the shuffling record, the indicated location in the respective block structure 123 of any data block, and the actual location of that data block do not all match may be relatively small. Additionally or alternatively, in some embodiments of the invention, the file may be inaccessible to the user during the brief time period during which the shuffling record, location indicated in the block structure 123, and the actual location of a data block do not match. In other words, a data block may be locked for reading and writing while that data block is in the process of being moved.

As an alternative to using the iterative loop from block 310 through block 330, the data blocks making up the file may all be moved after updating the shuffling record or the locations in the block structures 123, or both, or may all be moved before updating the shuffling record or the locations in the block structures 123, or both. However, in this case, the file may remain inaccessible for a longer period of time as the shuffling record or the locations in the block structures 123, or both, may differ from the actual locations of the data blocks for a longer period of time in such embodiments.

It will be understood by one skilled in the art that this method 300 of shuffling data blocks may be performed individually for each file in the storage system 100, or in batches. For instance, the storage system 100 may have a set of predefined shuffling algorithms, such that each file utilizes one of such shuffling algorithms. The files utilizing a common shuffling algorithm, including common attributes (e.g., common schedules), may be considered a group. Thus, this method 300 may be performed for each such group of files. When the shuffling criteria are met for a group of files, then the security management layer 140 may shuffle the data blocks of the files in that group. Alternatively, however, this method 300 may apply to each file individually.

Figure 4:
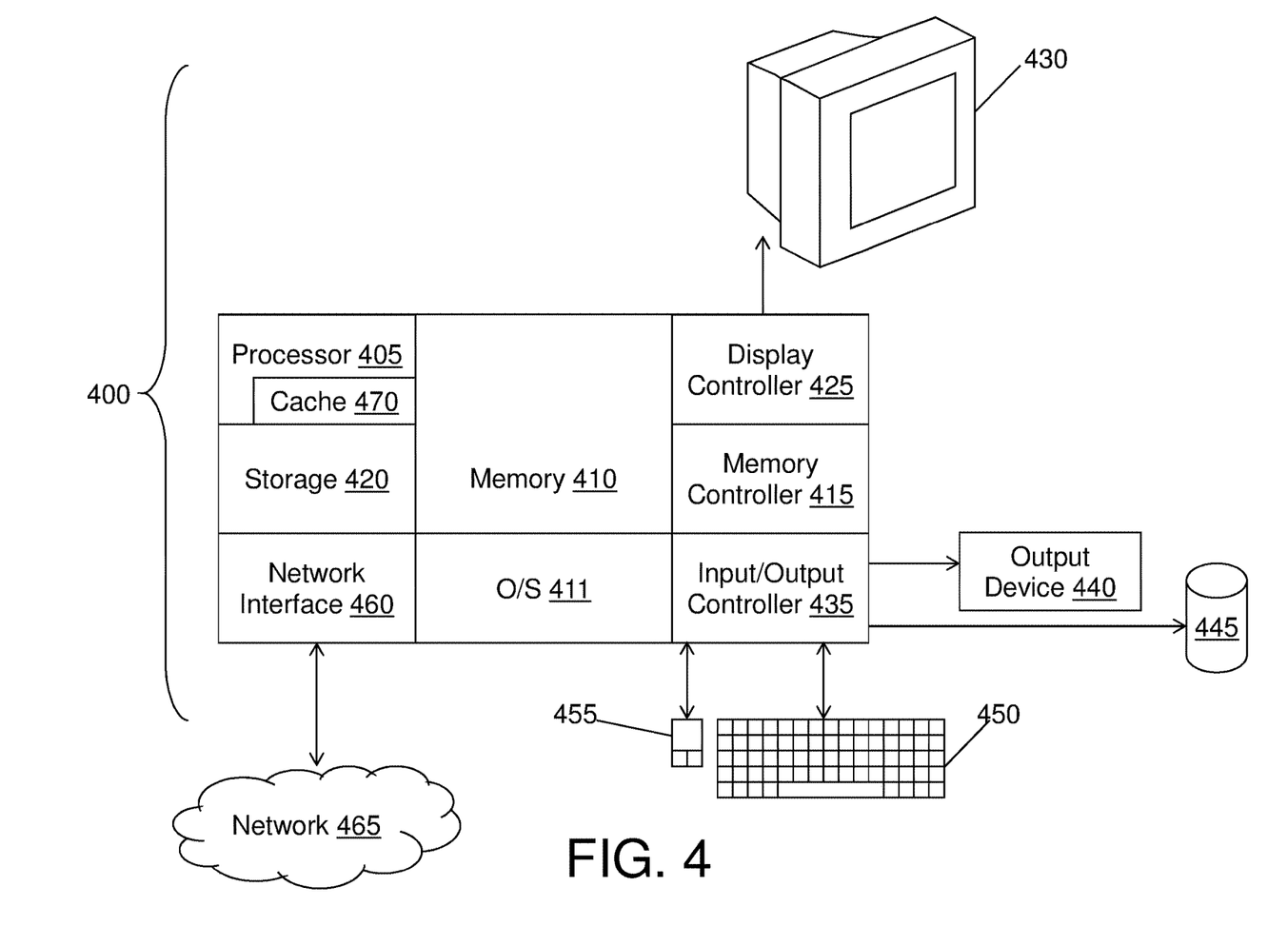
FIG. 4 is a block diagram of a computer system for implementing some or all aspects of the storage system, according to some embodiments of this invention.

FIG. 4 is a block diagram of a computer system 400 for implementing some or all aspects of the storage system 100, according to some embodiments of this invention. The storage systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For instance, each of the uniform interface 110, the virtual storage container 120, the virtual storage mapper 130, and the access control layer 150 may be implemented on a computer system 400.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor-based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid-state drive. The stored instructions in memory 410 or in storage 420 may include those enabling the processor to execute one or more aspects of the storage systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Storage systems 100 and methods according to this disclosure may be embodied, in whole or in part, in computer program products or in computer systems 400, such as that illustrated in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving a respective indication of each of two or more clouds;
adding the two or more clouds to a user account;
receiving a first file for storage in the user account;
assigning to the first file a first set of security attributes;
splitting the first file into a plurality of data blocks;
distributing the plurality of data blocks of the first file across the two or more clouds;
saving an indication of a respective location of each data block of the first file;
detecting a security risk to the first file;
modifying the first set of security attributes to result in a modified set of security attributes, the modifying performed automatically responsive to the security risk;
retrieving the first file from the two or more clouds responsive to the modified set of security attributes; and
redistributing the first file across the two or more clouds according to the modified set of security attributes.

2. The computer-implemented method of claim 1, further comprising:
receiving a request to access the first file;
determining the respective location of each data block of the first file;
retrieving each data block of the first file from the respective location in the two or more clouds;
aggregating the plurality of data blocks to recreate the first file; and
providing access to the recreated first file.

3. The computer-implemented method of claim 1, further comprising:
determining that shuffling criteria applicable to the first file are met;
shuffling the plurality of data blocks of the first file among the two or more clouds, responsive to the shuffling criteria being met.

4. The computer-implemented method of claim 1, further comprising:
assigning to the first file a splitting algorithm defining how to split the first file into the plurality of data blocks; and
assigning to the first file a shuffling algorithm defining when to shuffle the plurality of blocks among the two or more clouds;
wherein at least one of the shuffling algorithm and the splitting algorithm is selected based on a security level of the first file.

5. The computer-implemented method of claim 4, further comprising:
assigning an encryption algorithm to the first file; and
assigning to the first file an allocation algorithm defining how to distribute the plurality of data blocks among the two or more clouds.

6. The computer-implemented method of claim 1, further comprising mapping the two or more clouds to at least one of a single drive and a single folder.

7. The computer-implemented method of claim 6, further comprising:
receiving a plurality of files for storage in the user account;
for each file in the plurality of files:
splitting the file into a respective plurality of data blocks; and
distributing the respective plurality of data blocks across the two or more clouds;
maintaining a file management tree describing a virtualized hierarchy of the plurality of files and the first file; and
enabling a user to navigate the file management tree to select the first file; and
retrieving the first file from the two or more clouds, responsive to the selection of the first file.

8. A system comprising:
a memory having computer-readable instructions; and
one or more processors for executing the computer-readable instructions, the computer-readable instructions comprising:
receiving a respective indication of each of two or more clouds;
adding the two or more clouds to a user account;
receiving a first file for storage in the user account;
assigning to the first file a first set of security attributes;
splitting the first file into a plurality of data blocks;
distributing the plurality of data blocks of the first file across the two or more clouds;
saving an indication of a respective location of each data block of the first file;
detecting a security risk to the first file;
modifying the first set of security attributes to result in a modified set of security attributes, the modifying performed automatically responsive to the security risk;
retrieving the first file from the two or more clouds responsive to the modified set of security attributes; and
redistributing the first file across the two or more clouds according to the modified set of security attributes.

9. The system of claim 8, the computer-readable instructions further comprising:
receiving a request to access the first file;
determining the respective location of each data block of the first file;
retrieving each data block of the first file from the respective location in the two or more clouds;
aggregating the plurality of data blocks to recreate the first file; and
providing access to the recreated first file.

10. The system of claim 8, the computer-readable instructions further comprising:
determining that shuffling criteria applicable to the first file are met;
shuffling the plurality of data blocks of the first file among the two or more clouds, responsive to the shuffling criteria being met.

11. The system of claim 8, the computer-readable instructions further comprising:
assigning to the first file a splitting algorithm defining how to split the first file into the plurality of data blocks; and
assigning to the first file a shuffling algorithm defining when to shuffle the plurality of blocks among the two or more clouds;
wherein at least one of the shuffling algorithm and the splitting algorithm is selected based on a security level of the first file.

12. The system of claim 11, the computer-readable instructions further comprising:
assigning an encryption algorithm to the first file; and
assigning to the first file an allocation algorithm defining how to distribute the plurality of data blocks among the two or more clouds.

13. The system of claim 8, the computer-readable instructions further comprising mapping the two or more clouds to at least one of a single drive and a single folder.

14. The system of claim 13, the computer-readable instructions further comprising:
receiving a plurality of files for storage in the user account;
for each file in the plurality of files:
splitting the file into a respective plurality of data blocks; and
distributing the respective plurality of data blocks across the two or more clouds;
maintaining a file management tree describing a virtualized hierarchy of the plurality of files and the first file; and
enabling a user to navigate the file management tree to select the first file; and
retrieving the first file from the two or more clouds, responsive to the selection of the first file.

15. A computer-program product for storage management, the computer-program product comprising a computer-readable storage medium having program instructions embodied therewith, the program instructions executable by a processor to cause the processor to perform a method comprising:
receiving a respective indication of each of two or more clouds;
adding the two or more clouds to a user account;
receiving a first file for storage in the user account;
assigning to the first file a first set of security attributes;
splitting the first file into a plurality of data blocks;
distributing the plurality of data blocks of the first file across the two or more clouds;
saving an indication of a respective location of each data block of the first file;
detecting a security risk to the first file;
modifying the first set of security attributes to result in a modified set of security attributes, the modifying performed automatically responsive to the security risk;
retrieving the first file from the two or more clouds responsive to the modified set of security attributes; and
redistributing the first file across the two or more clouds according to the modified set of security attributes.

16. The computer-program product of claim 15, the method further comprising:
receiving a request to access the first file;
determining the respective location of each data block of the first file;
retrieving each data block of the first file from the respective location in the two or more clouds;
aggregating the plurality of data blocks to recreate the first file; and
providing access to the recreated first file.

17. The computer-program product of claim 15, the method further comprising:
determining that shuffling criteria applicable to the first file are met;
shuffling the plurality of data blocks of the first file among the two or more clouds, responsive to the shuffling criteria being met.

18. The computer-program product of claim 15, the method further comprising:
assigning to the first file a splitting algorithm defining how to split the first file into the plurality of data blocks; and
assigning to the first file a shuffling algorithm defining when to shuffle the plurality of blocks among the two or more clouds;
wherein at least one of the shuffling algorithm and the splitting algorithm is selected based on a security level of the first file.

19. The computer-program product of claim 18, the method further comprising:
assigning an encryption algorithm to the first file; and
assigning to the first file an allocation algorithm defining how to distribute the plurality of data blocks among the two or more clouds.

20. The computer-program product of claim 15, the method further comprising mapping the two or more clouds to at least one of a single drive and a single folder.

21. The computer-program product of claim 20, the method further comprising:
receiving a plurality of files for storage in the user account;
for each file in the plurality of files:
splitting the file into a respective plurality of data blocks; and
distributing the respective plurality of data blocks across the two or more clouds;
maintaining a file management tree describing a virtualized hierarchy of the plurality of files and the first file; and
enabling a user to navigate the file management tree to select the first file; and
retrieving the first file from the two or more clouds, responsive to the selection of the first file.

22. A computer-implemented method comprising:
receiving a first file for storage;
assigning to the first file a first set of security attributes comprising at least one of a first encryption algorithm, a first splitting algorithm, a first allocation algorithm, and a first shuffling algorithm;
receiving a second file for storage;
assigning to the second file a second set of security attributes comprising at least one of a second encryption algorithm, a second splitting algorithm, a second allocation algorithm, and a second shuffling algorithm;
wherein the second set of security attributes differ from the first set of security attributes;
distributing the first file across two or more clouds according to the first set of security attributes;
distributing the second file across the two or more clouds according to the second set of security attributes;
presenting the two or more clouds as at least one of a single drive and a single folder;
detecting a security risk to the first file;
modifying the first set of security attributes to result in a modified set of security attributes, the modifying performed automatically responsive to the security risk;
retrieving the first file from the two or more clouds responsive to the modified set of security attributes; and
redistributing the first file across the two or more clouds according to the modified set of security attributes.

23. The computer-implemented method of claim 22, wherein the distributing the first file across the two or more clouds according to the first set of security attributes comprises:
splitting the first file into a plurality of data blocks according to the first set of security attributes; and
distributing the plurality of data blocks across the two or more clouds according to the first set of security attributed.

* * * * *